United States Patent
Jung et al.

(10) Patent No.: US 8,345,021 B2
(45) Date of Patent: Jan. 1, 2013

(54) TOUCH SCREEN PANEL AND METHOD FOR FABRICATING THE SAME

(75) Inventors: Tae-Hyeog Jung, Suwon-si (KR); Jin-Guen Kim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 504 days.

(21) Appl. No.: 12/622,339

(22) Filed: Nov. 19, 2009

(65) Prior Publication Data

US 2010/0182259 A1    Jul. 22, 2010

(30) Foreign Application Priority Data

Jan. 16, 2009  (KR) ........................ 10-2009-0003629

(51) Int. Cl.
*G06F 3/042*    (2006.01)
(52) U.S. Cl. ....................... 345/176; 345/174
(58) Field of Classification Search ............ 345/87–100, 345/173–178; 178/18.01–18.09, 20.01–20.04
See application file for complete search history.

(56) References Cited

U.S. PATENT DOCUMENTS

| | | | |
|---|---|---|---|
| 6,879,096 B1 * | 4/2005 | Miyazaki et al. | 313/495 |
| 6,970,160 B2 * | 11/2005 | Mulligan et al. | 345/173 |
| 7,864,503 B2 * | 1/2011 | Chang | 361/288 |
| 2005/0084659 A1 * | 4/2005 | Dunkel | 428/209 |
| 2006/0077153 A1 * | 4/2006 | Cummings et al. | 345/85 |
| 2006/0097991 A1 | 5/2006 | Hotelling et al. | |
| 2008/0122661 A1 * | 5/2008 | Han | 341/22 |
| 2008/0264699 A1 * | 10/2008 | Chang et al. | 178/18.01 |

FOREIGN PATENT DOCUMENTS

| | | |
|---|---|---|
| CN | 1942853 A | 4/2007 |
| JP | 7-28598 | 1/1995 |
| JP | 2005-197200 | 7/2005 |
| JP | 2008-310551 | 12/2008 |
| KR | 20-0226352 | 6/2001 |
| KR | 10-2005-0072680 | 7/2005 |
| KR | 1020050072680 A | 7/2005 |
| KR | 1020060015449 A | 2/2006 |
| KR | 1020070006690 A | 1/2007 |
| KR | 1020080110477 A | 12/2008 |

OTHER PUBLICATIONS

Korean Office Action dated Feb. 28, 2011 issued by the KIPO for corresponding Korean Priority Application No. 10-2009-0003629, 2 pages.
KIPO Office action dated Aug. 30, 2010, for priority Korean Patent application 10-2009-0003629, noting listed reference in this IDS.
SIPO Office action dated Jul. 22, 2011, for corresponding Chinese Patent application 200910246553.4, 6 pages.
JPO Office Action dated Sep. 13, 2011, for corresponding Japanese Patent Application No. 2009-094023, 2 pages.

* cited by examiner

*Primary Examiner* — Vijay Shankar
(74) *Attorney, Agent, or Firm* — Christie, Parker & Hale, LLP

(57) ABSTRACT

A touch screen panel provided in an image display device. The touch screen panel includes a transparent substrate; a plurality of first sensing patterns on the transparent substrate and coupled to each other along a first direction; a first insulating film on the first sensing patterns; and a plurality of second sensing patterns on the first insulating film and coupled to each other along a second direction crossing the first direction, the second sensing patterns being alternately arranged with the first sensing patterns to not overlap with the first sensing patterns.

10 Claims, 5 Drawing Sheets

TOUCH SCREEN PANEL AND METHOD FOR FABRICATING THE SAME

CROSS-REFERENCE TO RELATED APPLICATIONS

This application claims priority to and the benefit of Korean Patent Application No. 10-2009-0003629, filed on Jan. 16, 2009, in the Korean Intellectual Property Office, the entire content of which is incorporated herein by reference.

BACKGROUND OF THE INVENTION

1. Field of the Invention

The present invention relates to a touch screen panel provided in an image display device, etc., and a method for fabricating the same.

2. Description of Related Art

A touch screen panel is an input device by which a user can input his or her instruction by selecting an instructed content displayed on a screen such as an image display device, etc. using a human's finger or an object.

To this end, the touch screen panel is provided on the front face of the image display device to convert a contact position with the human's finger or object into an electrical signal. Therefore, the instructed content selected on the contact position is accepted as an input signal.

Applications of the touch screen panel as described above are expanding widely because it can replace an input device coupled to and for operating the image display device such as a keyboard, a mouse, or the like.

A touch screen panel can be categorized into a photosensitive type, an electrostatic capacitive type or a resistive type.

Among the types of touch screen panels, the electrostatic capacitive type touch screen panel allows a conductive sensing pattern to sense change in electrostatic capacitance formed in association with other sensing patterns in the vicinity thereof or a ground electrode, etc., thereby converting a touch with a contact position into an electrical signal.

Here, in order to clearly determine the contact position on the contact surface, the sensing pattern includes first sensing patterns (X patterns) formed to be coupled along a first direction, and second sensing patterns (Y patterns) formed to be coupled along a second direction.

The first and second sensing patterns as described above are generally positioned in the same layer. In this case, the sensing patterns positioned in the same X or Y lines are coupled by forming separate coupling patterns through contact holes formed in insulating films thereon. Accordingly, additional masks may be required and the fabrication process thereof may be complicated.

SUMMARY OF THE INVENTION

Aspects of embodiments of the present invention are directed toward a touch screen panel that is fabricated with reduced number of masks and a simplified process, and a method for fabricating the same.

According to one embodiment of the present invention, there is provided a touch screen panel including: a transparent substrate; a plurality of first sensing patterns on a first side of the transparent substrate and coupled to each other along a first direction; a first insulating film on the first sensing patterns; and a plurality of second sensing patterns on the first insulating film and coupled to each other along a second direction crossing the first direction, the second sensing patterns being alternately arranged with the first sensing patterns to not overlap with the first sensing patterns.

Here, the first sensing patterns having a same X-coordinate may be coupled to each other by a column unit and the second sensing patterns having a same Y-coordinate may be coupled to each other by a row unit, the touch screen panel may further include a plurality of metal patterns on an edge portion of the region where the first and second sensing patterns are formed to electrically couple the first and second sensing patterns by the row unit or by the column unit to position detecting lines.

The touch screen panel may further include a transparent ground electrode on a second side of the transparent substrate opposite to the first side of the transparent substrate.

According to another embodiment of the present invention, there is provided a method of fabricating a touch screen panel, the method including: forming a plurality of first sensing patterns to be coupled to each other along a first direction on a first side of a transparent substrate; forming a first insulating film on the first sensing patterns; and forming a plurality of second sensing patterns to be coupled to each other along a second direction on the first insulating film, the second sensing patterns being disposed not to overlap with the first sensing patterns, the second direction crossing the first direction.

Here, the first and second sensing patterns may be coupled along the first direction or the second direction while being patterned.

The first insulating film may be formed using a printing method.

The method of fabricating the touch screen panel may further include forming a second insulating film on the second sensing patterns using a printing method.

The method of fabricating the touch screen panel may further include forming a transparent ground electrode on a second side of the transparent substrate opposite to the first side of the transparent substrate. The second sensing patterns may be disposed alternately with the first sensing patterns to not overlap with the first sensing patterns.

With the embodiments of the present invention as described above, the first sensing patterns coupled to each other along the first direction and the second sensing patterns coupled to each other along the second direction are disposed on different layers, making it possible to reduce the number of masks and to simplify the fabrication process.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF EXEMPLARY EMBODIMENTS

Figure 1:
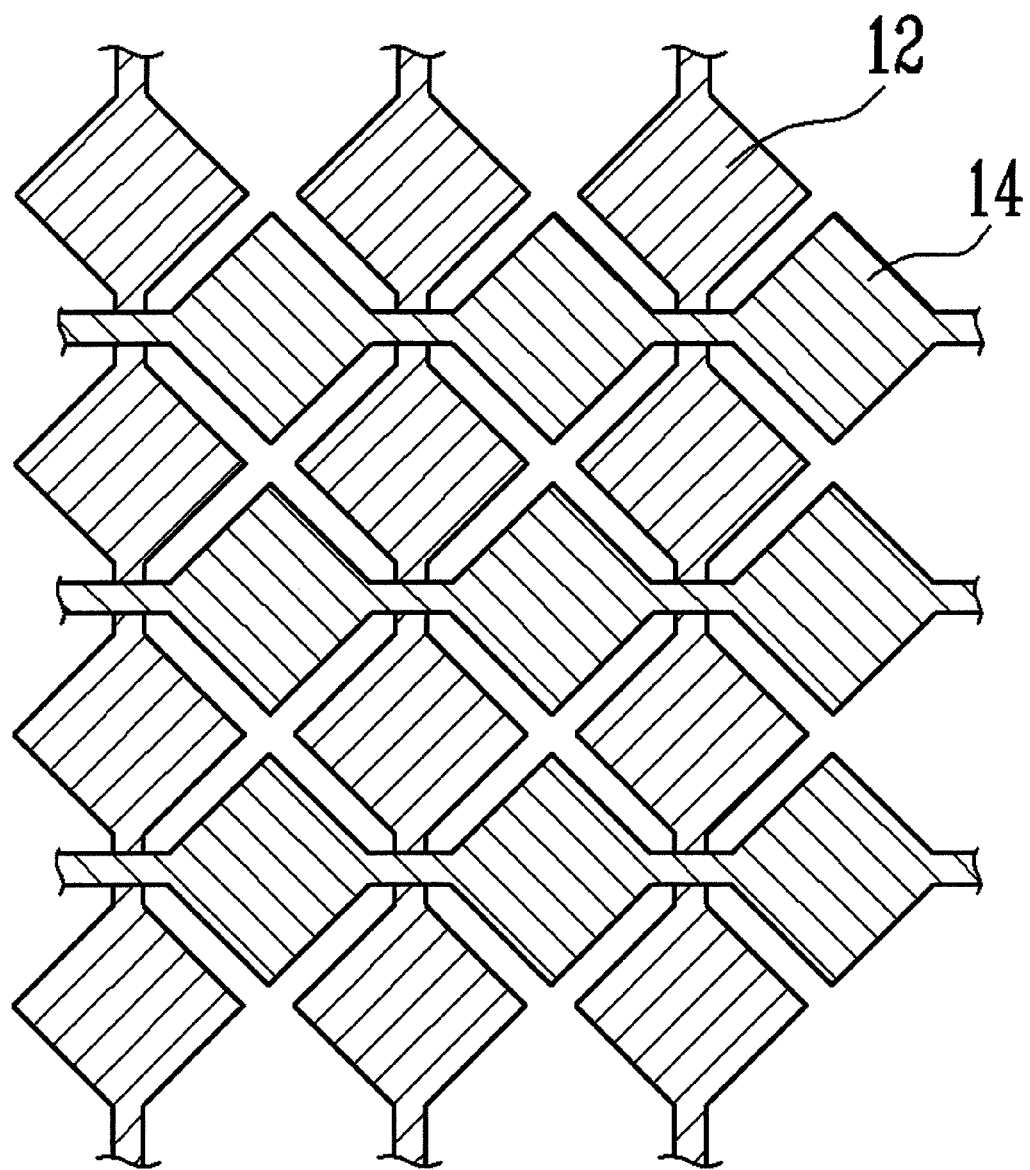
FIG. 1 is a plan schematic view showing an arrangement of sensing patterns according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the element or be indirectly on the element with one or more intervening elements interposed therebetween. Also, when an element is referred to as being "connected to" another element, it can be directly connected to the element or be indirectly connected to the element with one or more intervening elements interposed therebetween. Hereinafter, like reference numerals refer to like elements.

Hereinafter, exemplary embodiments according to the present invention will be described in more detail with reference to the accompanying drawings.

FIG. 1 is a plan schematic view showing an arrangement of sensing patterns according to an embodiment of the present invention.

Referring to FIG. 1, the sensing patterns according to the embodiment of the present invention include first and second sensing patterns 12 and 14 that are alternately disposed, wherein the sensing patterns in one column unit having the same X-coordinate or the sensing patterns in one row unit having the same Y-coordinate are coupled to each other.

For example, the first sensing patterns 12 may include a plurality of X patterns, wherein the sensing patterns disposed in one column having the same X-coordinate along a first direction (e.g., a column direction) are coupled to each other. The second sensing patterns 14 may include a plurality of Y patterns, wherein the sensing patterns disposed in one row having the same Y-coordinate along a second direction (e.g., a row direction) are coupled to each other.

However, in the embodiment of FIG. 1, the first sensing patterns 12 and the second sensing patterns 14 are disposed on different layers, respectively. For example, the first sensing patterns 12 may be positioned on lower layers; the second sensing patterns 14 may be positioned on upper layers; and insulating films may be interposed therebetween.

As described above, if the first sensing patterns 12 and the second sensing patterns 14 are disposed on different layers, respectively, the first sensing patterns 12 positioned on the same column can be formed to be coupled to each other while patterning the first sensing patterns 12, and the second sensing patterns 14 positioned on the same row can be formed to be coupled to each other while patterning the second sensing patterns 14.

Therefore, a process of forming separate contact holes and coupling patterns can be omitted, thereby making it possible to reduce the number of masks and to simplify the process.

Figure 2:
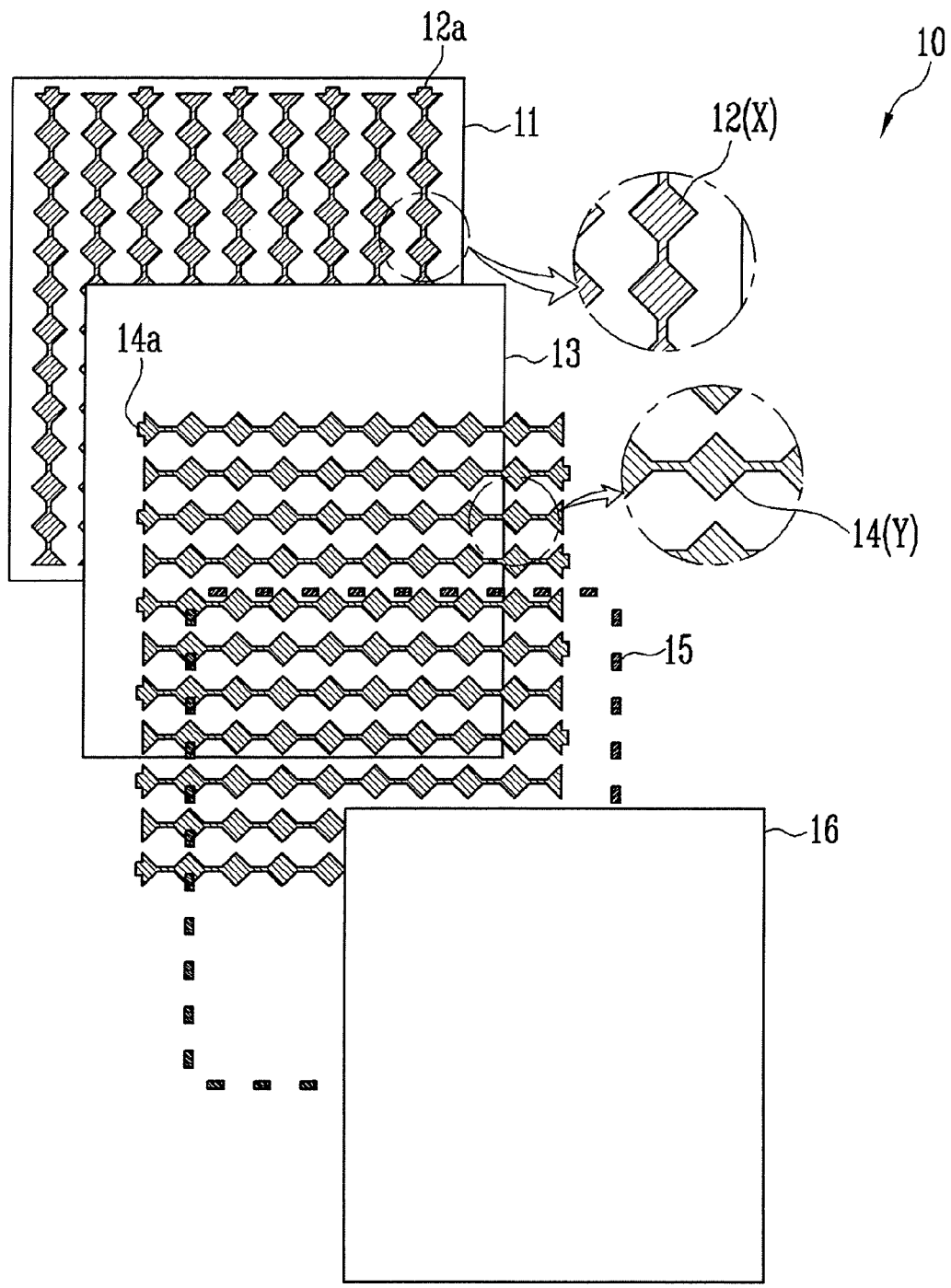
FIG. 2 is an exploded plan schematic view of a touch screen panel according an embodiment of the present invention.
Figure 3:
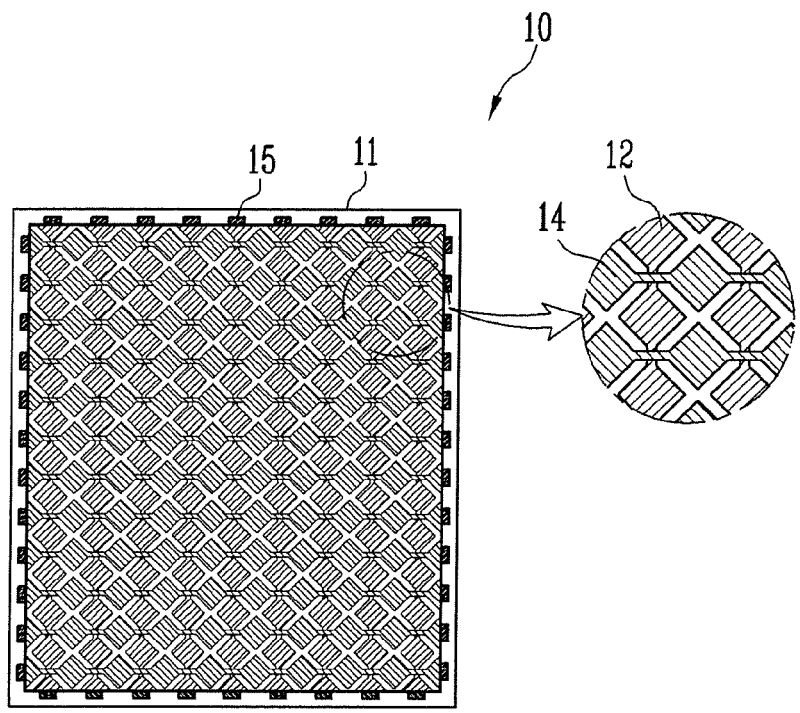
FIG. 3 is a plan schematic view of the assembled touch screen panel of FIG. 2.

FIG. 2 is an exploded plan schematic view of a touch screen panel according an embodiment of the present invention, and FIG. 3 is a plan schematic view of the assembled touch screen panel of FIG. 2.

Referring to FIGS. 2 and 3, the touch screen panel 10 according to the embodiment of the present invention includes a transparent substrate 11. In addition, the touch screen panel 10 includes first sensing patterns 12, a first insulating film 13, second sensing patterns 14, metal patterns 15 and a second insulating film 16 that are formed sequentially on the transparent substrate 11.

The first sensing patterns 12 are formed on one surface of the transparent substrate 11 to be coupled to each other along a first direction. For example, the first sensing patterns 12 may be formed on the upper surface of the transparent substrate 11 to be closed to each other, having a regular pattern such as a diamond pattern. The first sensing patterns 12 as described above may include a plurality of X patterns, wherein the first sensing patterns 12 in one column having the same X-coordinates are coupled to each other. Here, the shapes of the first sensing patterns 12 are not limited to the diamond shapes, but it may be implemented as various suitable shapes such that the sensing patterns can be close to each other.

The first sensing patterns 12 have pads 12a that are electrically coupled to the metal patterns 15 for each column of the first sensing patterns 12. The pads 12a of the first sensing patterns 12 may be alternately provided on the upper side or the lower side, may be positioned on only the upper side or the lower side, or may be positioned on both the upper and lower sides for each column of the first sensing patterns 12.

However, the first sensing patterns 12 are formed not to be overlapped with the second sensing patterns 14, except for the coupling portions thereof. In other words, the first sensing patterns 12 and the second sensing patterns 14 are disposed alternately to cross each other.

The first insulating film 13 is formed on the first sensing patterns 12 to cover them.

The second sensing patterns 14 are formed on the first insulating layer 13 to be coupled to each other along a second direction, but are disposed alternately with the first sensing patterns 12 so as not to be overlapped with the first sensing patterns 12. For example, the second sensing patterns 14 may be formed to be closed to each other, having the same diamond pattern as the first sensing patterns 12, and may include a plurality of Y patterns, wherein the second sensing patterns 14 in one column having the same Y-coordinate are coupled to each other.

The second sensing patterns 14 have pads 14a that are electrically coupled to the metal patterns 15 for each row of the second sensing patterns 14. The pads 14a of the second sensing patterns 14 may be alternately provided on the left side or the right side, may be positioned on only the left side or the right side, or may be positioned on both the left and right sides for each row of the second sensing patterns 14.

In addition, the first and second sensing patterns 12 and 14 and the first insulating film 13 are composed of transparent material so that light emitted from a display panel, etc. disposed below the lower portion of the touch screen panel 10 can transmit through the touch screen panel 10. In one embodiment, the first and second sensing patterns 12 and 14 are composed of a transparent electrode material such as indium tin oxide (hereinafter, referred to as ITO), and the first insulating film 13 is composed of a transparent insulating material.

The thicknesses of the first and second sensing patterns 12 and 14 and the first insulating film 13 can be set to be within a suitable range such that the touch screen panel 10 (in particular, the first and second sensing patterns 12 and 14) have a relatively low surface resistance, and can provide sufficient transmittance of light transmitted from the display panel. In other words, the thickness of the first and second sensing patterns 12 and 14 and the first insulating film 13 can be designed in consideration of the transmittance and the surface resistance.

In one embodiment, each of the first and second sensing patterns 12 and 14 may be formed of an indium tin oxide (hereinafter, referred to as ITO) pattern having a thickness between 100 and 300 Å, and the first insulating film 13 may be composed of a transparent insulating material having a thickness between 400 and 1000 Å (e.g., a thickness between 400 and 700 Å) with an optical refractive index between 1.6 and 1.9 (based on 550 nm wavelength). However, the present invention is not limited to the above-described embodiment.

Therefore, the thickness thereof may be suitably changed in consideration of the transmittance and/or the surface resistance, etc.

The metal patterns 15 are disposed on the edge portions of the regions where the first and second sensing patterns 12 and 14 are formed, for example, on regions corresponding to the pads 12a and 14a of the first and second sensing patterns 12 and 14. The metal patterns 15 as described above electrically couple the sensing patterns 12 and 14 in column units and/or in row units to position detecting lines, respectively, to allow contact position detecting signals to be supplied to a driving circuit, etc.

The second insulating film 16 is formed on the second sensing patterns 14 to cover them. For example, the second insulating film 16 may be formed on the second sensing patterns 14, composed of transparent insulating material having a thickness between 400 and 1000 Å. The second insulating film 16 as described above may be omitted in some embodiments according to the design of a product.

If the assembled touch screen panel 10 as shown in FIG. 3 is touched by a human's finger or an object, a change in electrostatic capacitance in accordance with the contact position is transferred to the driving circuit side via the first and second sensing patterns 12 and 14, the metal patterns 15 and the position detecting lines. The change in electrostatic capacitance is converted into an electrical signal, for example, by the X and Y input processing circuits, etc. so that the contact position is determined.

With the touch screen panel 10 as described in the above embodiment, the first sensing patterns 12 coupled to each other along the first direction and the second sensing patterns 14 coupled to each other along the second direction are disposed on different layers, thereby making it feasible to reduce the number of masks used in the fabrication process of the touch screen panel 10 and to simplify the process.

Figure 4:
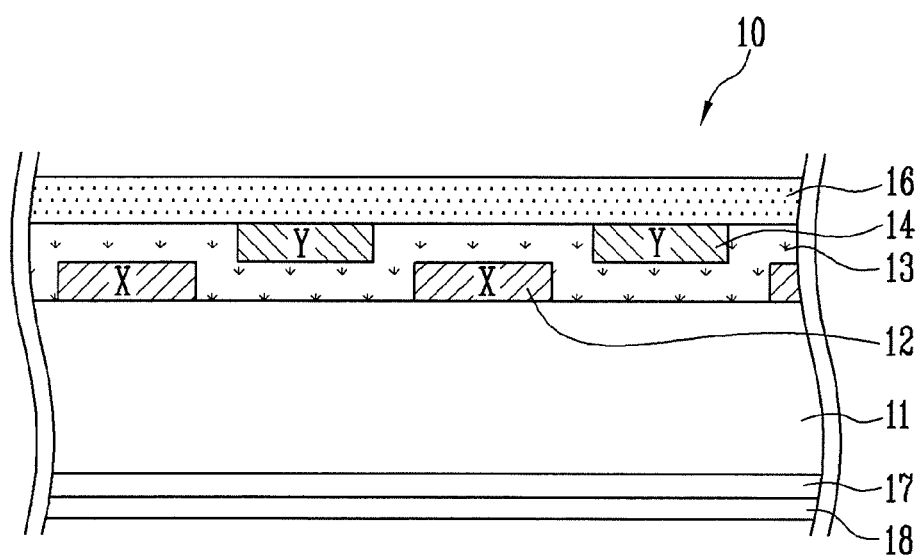
FIG. 4 is a cross-sectional schematic view of certain parts of the assembled touch screen panel of FIG. 2.

FIG. 4 is a cross-sectional schematic view of certain parts of the assembled touch screen panel of FIG. 2. When describing FIG. 4, the same reference numerals are given to the same elements as shown in FIGS. 2 and 3, and the detailed description thereof will be omitted.

Referring to FIG. 4, the first sensing patterns 12 and the second sensing patterns 14 are interposed between the first insulating film 13 and are disposed alternately in different layers.

If the first and second sensing patterns 12 and 14 are disposed on different layers as described above, the first or second sensing patterns 12 or 14 positioned on the same column and on the same row can be coupled during a patterning step. Accordingly, a process of forming contact holes for coupling the first or second sensing patterns 12 or 14 positioned on the same column and/or on the same row may be omitted.

In addition, a transparent ground electrode 17 and a third insulating film 18 that covers the transparent ground electrode 17 may be further formed on the other surface opposite to the surface of the transparent substrate 11 on which the first and second sensing patterns 12 and 14 are formed, that is, on the lower surface of the transparent substrate 11.

In one embodiment, the transparent ground electrode 17 composed of a transparent electrode material such as ITO, etc. having a thickness between 100 and 300 Å may be formed on the lower surface of the transparent substrate 11, and the third insulating film 18 that covers the transparent ground electrode 17, having a thickness between 400 and 1000 Å, may be formed on the lower surface of the transparent ground electrode 17.

However, the present invention is not limited to the above-described embodiment, and the thicknesses of the transparent ground electrode 17 and the third insulating film 18 may be modified in consideration of the desired light transmittance, etc. Also, the transparent ground electrode 17 and/or the third insulating film 18 may also be omitted in some embodiments according to the design of a product.

The transparent ground electrode 17 may be utilized in securing stability between the touch screen panel 10 and the display panel, etc., and may also be used in forming the first and second sensing patterns 12 and 14 and the electrostatic capacitance according to the design method of the touch screen panel 10.

In other words, in the electrostatic capacitive type touch screen panel 10, in order to sense the contact position, the electrostatic capacitance between the first sensing pattern 12 and the second sensing pattern 14 may be used, or the electrostatic capacitance between the first and second sensing patterns 12 and 14 and the transparent ground electrode 17 may be utilized, wherein these sensing patterns may be suitably modified.

FIGS. 5A to 5E are cross-sectional schematic views sequentially showing a method of fabricating the touch screen panel of FIG. 4.

Figure 5A:
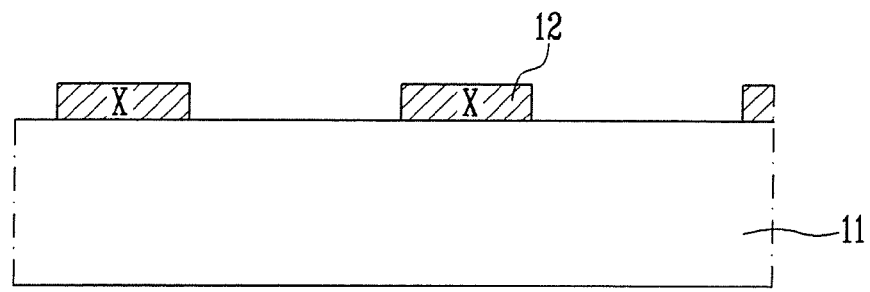
FIGS. 5A, 5B, 5C, 5D and 5E are cross-sectional schematic views sequentially showing a method of fabricating the touch screen panel of FIG. 4.

First, referring to FIG. 5A, a transparent electrode material such as ITO is deposited on an upper portion of a transparent substrate 11 and then is patterned, thereby forming first sensing patterns 12. Here, although coupling parts of the first sensing patterns 12 are not shown, the first sensing patterns 12 are patterned in order to be coupled to each other in a first direction (for example, in a column direction).

Figure 5B:
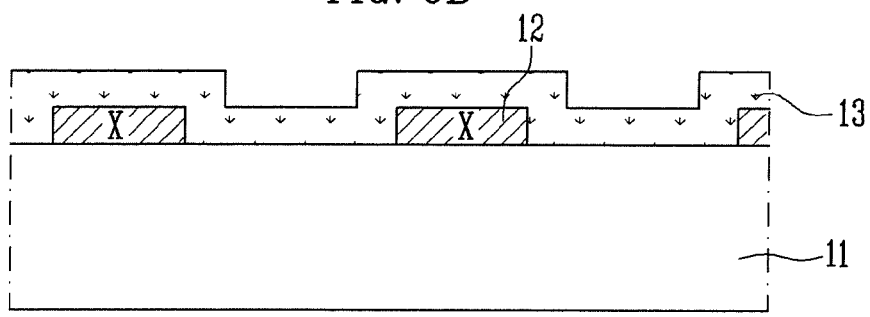

Thereafter, as shown in FIG. 5B, a first insulating material is printed and fired (or cured) on the first sensing patterns 12 utilizing a suitable printing method, thereby forming a first insulating film 13. While the first insulating film 13 may be formed by utilizing the printing method according to the above-described embodiment of the present invention, the present invention is not limited thereto. For example, the first insulating film 13 may be formed by utilizing a chemical vapor deposition (CVD) method and/or a sputtering method.

Figure 5C:
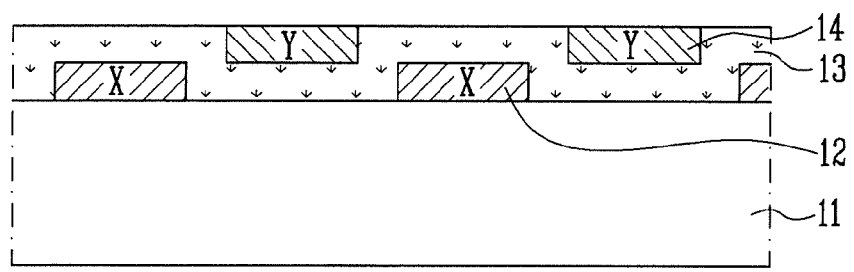

Thereafter, as shown in FIG. 5C, a transparent electrode material such as ITO is deposited on the first insulating film 13 and then is patterned, thereby forming second sensing patterns 14. Here, the second sensing patterns 14 are disposed in positions not overlapping with the first sensing patterns 12 (but, the coupling parts of the second sensing patterns 14 may overlap). The second sensing patterns 14 are patterned in order to be coupled to each other in a second direction (for example, in a row direction).

In addition, after the second sensing patterns 14 are formed, the metal patterns 15 and position detecting lines, etc. shown in FIGS. 2 and 3 are further formed utilizing a low resistance material having lower surface resistance than the transparent electrode material, such as a triple-layer of molybdenum/aluminum/molybdenum or a chrome film, etc.

Figure 5D:
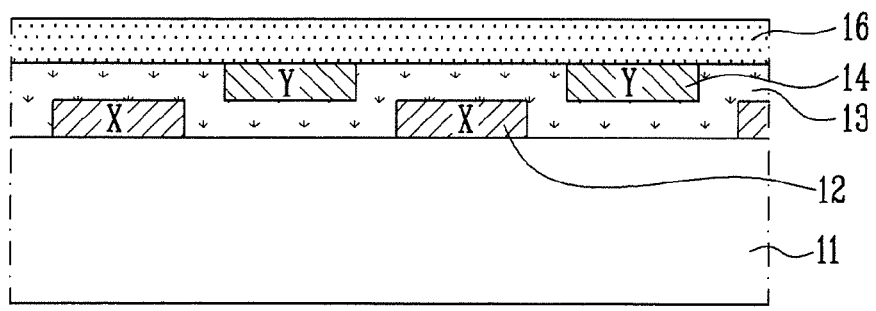

Thereafter, as shown in FIG. 5D, a second insulating material is printed and fired (or cured) on the second sensing patterns 14 and the metal patterns 15 in FIGS. 2 to 3 by utilizing a suitable printing method, thereby forming a second insulating film 16. While the second insulating film 16 may be formed by the above-described printing method, the second insulating film 16 may alternatively be formed utilizing a CVD method and/or a sputtering method.

Figure 5E:
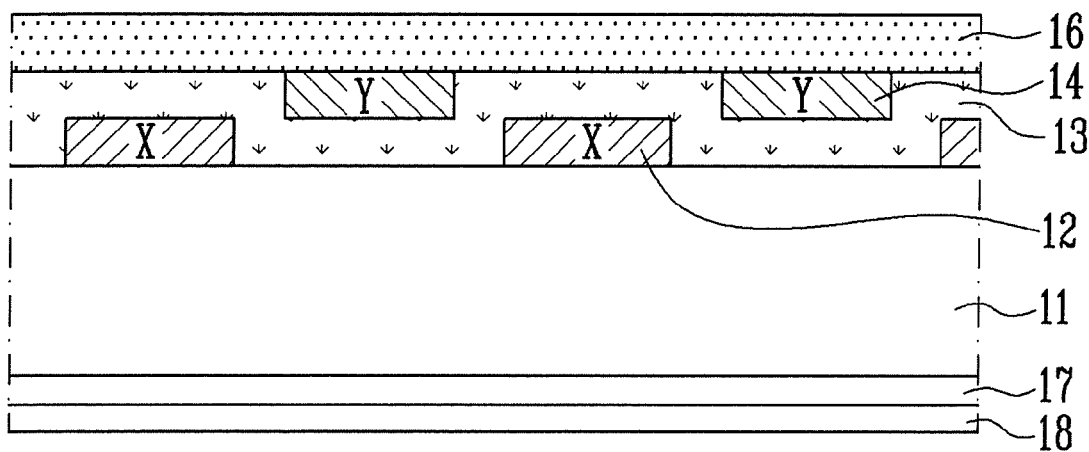

Thereafter, as shown in FIG. 5E, a transparent ground electrode 17 is deposited over the bottom surface of the transparent substrate 11 and furthermore, a third insulating film 18 is formed utilizing a suitable printing method, a suitable CVD method and/or a suitable sputtering method, etc., in order to cover the transparent ground electrode 17.

In view of the foregoing, with the method of fabricating the touch screen panel according to an embodiment of the present invention, the number of masks utilized is reduced and the process step is simplified, making it possible to enhance process efficiency.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
a transparent substrate;
a plurality of first sensing patterns on a first side of the transparent substrate and coupled to each other along a first direction;
a first insulating film on the first sensing patterns; and
a plurality of second sensing patterns on the first insulating film and coupled to each other along a second direction crossing the first direction, the second sensing patterns being alternately arranged with the first sensing patterns to not overlap with the first sensing patterns,
wherein the first and second sensing patterns are composed of a transparent electrode material having a thickness between about 100 and about 300 Å, and
wherein the first insulating film is composed of a transparent insulating material having a thickness between about 400 and about 1000 Å.

2. The touch screen panel as claimed in claim 1,
wherein the first sensing patterns having a same X-coordinate are coupled to each other by a column unit and the second sensing patterns having a same Y-coordinate are coupled to each other by a row unit,
the touch screen panel further comprising a plurality of metal patterns on an edge portion of a region where the first and second sensing patterns are formed to electrically couple the first and second sensing patterns by the row unit or by the column unit to position detecting lines.

3. The touch screen panel as claimed in claim 1, further comprising:
a second insulating film on the second sensing patterns.

4. The touch screen panel as claimed in claim 1, further comprising:
a transparent ground electrode on a second side of the transparent substrate opposite to the first side of the transparent substrate.

5. A method of fabricating a touch screen panel, the method comprising:
forming a plurality of first sensing patterns to be coupled to each other along a first direction on a first side of a transparent substrate;
forming a first insulating film on the first sensing patterns; and
forming a plurality of second sensing patterns to be coupled to each other along a second direction on the first insulating film, the second sensing patterns being disposed not to overlap with the first sensing patterns, the second direction crossing the first direction,
wherein the first and second sensing patterns are composed of a transparent electrode material having a thickness between about 100 and about 300 Å, and
wherein the first insulating film is composed of a transparent insulating material having a thickness between about 400 and about 1000 Å.

6. The method of fabricating the touch screen panel as claimed in claim 5, wherein the first and second sensing patterns are coupled along the first direction or the second direction while being patterned.

7. The method of fabricating the touch screen panel as claimed in claim 5, wherein the first insulating film is formed by a printing method.

8. The method of fabricating the touch screen panel as claimed in claim 5, further comprising:
forming a second insulating film on the second sensing patterns by a printing method.

9. The method of fabricating the touch screen panel as claimed in claim 5, further comprising:
forming a transparent ground electrode on a second side of the transparent substrate opposite to the first side of the transparent substrate.

10. The method of fabricating the touch screen panel as claimed in claim 5, wherein said forming the plurality of second sensing patterns comprises disposing the second sensing patterns alternately with the first sensing patterns to not overlap with the first sensing patterns.

* * * * *